Nov. 23, 1948.  B. E. BERLINGER  2,454,590
CONTINUOUS SHAFT BRAKE FOR FISHING REELS
Filed Nov. 17, 1944
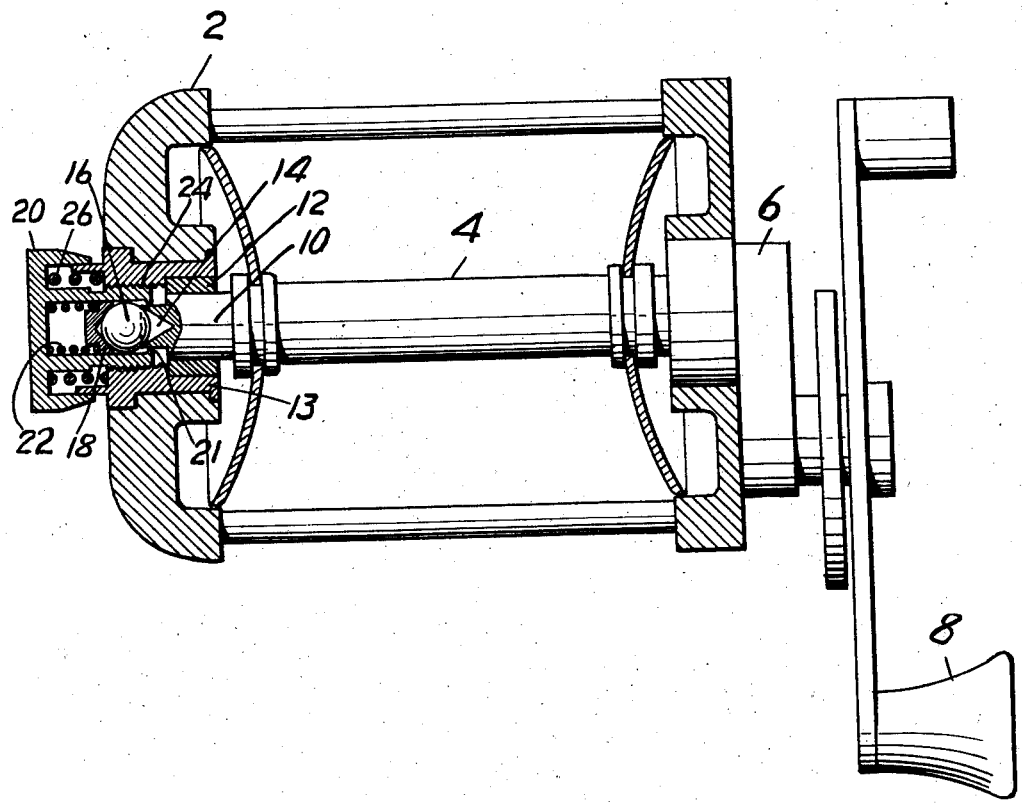
INVENTOR
Bernard E. Berlinger
BY
ATTORNEYS.
WITNESS:

Patented Nov. 23, 1948

2,454,590

UNITED STATES PATENT OFFICE 2,454,590

CONTINUOUS SHAFT BRAKE FOR FISHING REELS

Bernard E. Berlinger, Elkins Park, Pa., assignor to Quaker City Gear Works, Inc., Philadelphia, Pa., a corporation of Pennsylvania Application November 17, 1944, Serial No. 563,832

10 Claims. (Cl. 188—83)

This invention relates to fishing reels and has particular reference to means for automatically snubbing the spool to afford proper control thereof and, in particular, to prevent backlash. In casting with an ordinary reel there occurs a tendency under various conditions for the rotation of the spool to get ahead of the throw, either while the lure is in the air or when it hits the water. Under such circumstances, backlash may occur due to the fact that the line will be momentarily wound up in reverse direction by the spinning spool, resulting in a jerking action and possible snarling of the line, with the least objectionable action being that of substantially reducing the distance attained. To prevent this, a snubbing action is generally applied with the thumb, the expert caster being able to determine just what amount of thumbing is necessary to secure proper control of the feed of the line. However, even the most expert caster is unable fully to exercise thumbing control inasmuch as the events involved in backlash occur with extreme rapidity. In particular, it is very difficult to cause the spool to stop at the instant the lure strikes the water. If substantially instantaneous stopping does not then occur, backlash is almost inevitable.

The object of the present invention is the provision of an automatic snubbing arrangement adaptable to all types of fishing reels. In brief, this involves applying forces substantially at the axis of rotation of the spool for control of its rotation, the controlling action being automatic and instantaneous and, accordingly, far more effective in insuring proper action than in manually applied snubbing.

The foregoing general object, as well as more specific objects of the invention, particularly relating to details, will become apparent from the following description read in conjunction with the accompanying drawing, in which the figure represents, in axial section, a conventional type of reel to which the invention has been applied.

The body of the reel, indicated generally at 2, supports in bearings the spool 4, arranged to be wound through the gearing in the conventional housing 6 by a crank 8. The reel is adapted to be secured to a rod in conventional fashion.

The right-hand bearing of the spool is conventional and is not illustrated in the drawing. The shaft extension 10 at the left-hand end of the spool is mounted in a conventional bronze bearing 12 within a bushing 13. This end of the shaft is provided with a conical socket 14 having a cone angle preferably about 60° to provide a seat for a steel ball 16 on the opposite side of which, and in axial alignment with the shaft and ball, is a member 18 also provided with a conical socket, but in this case having a wide cone angle, for example, of about 120°. This member or cap is desirably formed of brass. The ball and cap are received in a central bore of a screw head 20 of micrometer type, the open end of the bore being provided with a flange 21 so that, upon disassembly, the ball and member 18 will not fall therefrom. The member 18 is backed up by a helical spring 22 seated in the bottom of the bore. The screw member 20 is threaded at 24 into the bushing 13 and encloses a helical spring 26, which acts as a friction or damping member for maintaining adjustment of the screw. It will be evident that the purpose of the adjustment is to provide adjustment of the compression force exerted by the spring 22 on the member 18, which adjustment may be made to suit the individual desires of the caster when various weights of fishing lures are used.

The spring is preferably so arranged that as unreeling of the spool takes place, the pull which is exerted through the ball 16 and the member 18 will tend to unwind the helical spring. This, however, does not appear to be absolutely essential, though somewhat better snubbing action occurs with this arrangement.

The precise reason for the snubbing action is not known, but possibly has to do largely with the kinetic action of revolution of the ball in the conical sockets in conjunction with the spring action on the member 18. As the lure and line are flying through the air, the snubbing control offers very little frictional resistance to rotation of the spool, the friction being negligibly, if at all, greater than that involved in the use of conventional bearings. As soon, however, as the force of tension in the line drops so that the spool should slow down so as not to overrun the line, an immediate snubbing action occurs by the imposition of frictional forces closely adjacent to the axis of rotation of the spool through the combined action of the spring member 18 and ball 16 in conjunction with the conical sockets. This is probably due to very slightly eccentric movement of the ball coupled with a release of forces on the spring 22, causing it to effect a shift of the member 18 in a direction reverse to that in which the member 18 was frictionally moved during the unwinding rotation of the spool. At any rate, the action is such as to slow down the spool almost instantaneously to fit the linear movement of the line, the spool coming almost instantaneously to rest when the lure hits the water.

The snubbing action of the mechanism just described also effects straightening out of a carelessly wound spool.

What I claim and desire to protect by Letters Patent is:

1. A fishing reel comprising a spool shaft, a bearing for each end of said shaft, the shaft at one end having an axially centered conical socket therein, a ball seated in said socket, a member in axial alignment with said ball and said socket and having a conical socket seated on said ball, and a spring axially urging said member against said ball.

2. A fishing reel comprising a spool shaft, a bearing for each end of said shaft, the shaft at one end having an axially centered conical socket therein, a ball seated in said socket, a member in axial alignment with said ball and said socket and having a conical socket seated on said ball, a spring axially urging said member against said ball, means for adjusting the axial force exerted by said spring, and a second spring maintaining the adjustment of said spring adjusting means.

3. A fishing reel comprising a spool shaft, a bearing for each end of said shaft, the shaft at one end having an axially centered conical socket therein, a ball seated in said socket, a member in axial alignment with said ball and said socket and having a conical socket seated on said ball, and a helical spring axially urging said member against said ball.

4. A fishing reel comprising a spool shaft, a bearing for each end of said shaft, the shaft at one end having an axially centered conical socket therein, a ball seated in said socket, a member in axial alignment with said ball and said socket and having a conical socket seated on said ball, a helical spring axially urging said member against said ball, means for adjusting the axial force exerted by said spring, and a second helical spring surrounding the first spring in engagement with the means for adjusting the first spring for maintaining said means in its adjusted position.

5. A fishing reel comprising a spool shaft, a bearing for each end of said shaft, the shaft at one end having an axially centered conical socket therein, a ball seated in said socket, a member in axial alignment with said ball and said socket and having a conical socket seated on said ball, and a spring axially urging said member against said ball, said conical socket in said member having a cone angle substantially exceeding the cone angle of the socket in the shaft.

6. A fishing reel comprising a spool shaft, a bearing for each end of said shaft, the shaft at one end having an axially centered conical socket therein, a ball seated in said socket, a member in axial alignment with said ball and said socket, and a spring axially urging said member against said ball.

7. A fishing reel comprising a spool shaft, a bearing for each end of said shaft, the shaft at one end having an axially centered conical socket therein, a ball seated in said socket, a member in axial alignment with said ball and said socket, a spring axially urging said member against said ball, means for adjusting the axial force exerted by said spring, and a spring for maintaining said means in its adjusted position.

8. A fishing reel comprising a spool shaft, a bearing for each end of said shaft, the shaft at one end having an axially centered conical socket therein, a ball seated in said socket, a member in axial alignment with said ball and said socket, and a helical spring axially urging said member against said ball.

9. A fishing reel comprising a spool shaft, a bearing for each end of said shaft, the shaft at one end having an axially centered conical socket therein, a ball seated in said socket, a member in axial alignment with said ball and said socket, a helical spring axially urging said member against said ball, and means for adjusting the axial force exerted by said spring.

10. A fishing reel comprising a body, a bushing in said body having a bearing therein, a spool shaft one end thereof being mounted in said bearing, the said end of the shaft being shaped to be engaged by a friction member, a headed screw threaded in said bushing having an axial chamber in the body of the screw and an annular chamber in the head, a friction member for the end of the shaft and a helical spring within the axial chamber arranged to be adjusted by said screw to vary the friction on the shaft, a second helical spring within the annular chamber in engagement with the inner face of the head of the screw and the body of the reel to retain the screw in its adjusted position, and an annular flange extending from the bushing surrounding the second helical spring and extending into the annular chamber in the head of the screw, whereby said second spring is encased.

BERNARD E. BERLINGER.

REFERENCES CITED

The following references are of record in the file of this patent:

UNITED STATES PATENTS

| Number | Name | Date |
|---|---|---|
| 1,462,716 | Masin | July 24, 1923 |
| 2,249,297 | Muffett | July 15, 1941 |
| 2,347,173 | Coxe | Apr. 25, 1944 |